(12) United States Patent
Aldridge

(10) Patent No.: US 10,161,499 B2
(45) Date of Patent: Dec. 25, 2018

(54) SYSTEM AND PROCESS FOR REMOVING HARDENED LUBRICANT FROM AN ENCLOSED GEARBOX

(71) Applicant: Horizon Valve Services, Inc., Hominy, OK (US)

(72) Inventor: Roy A. Aldridge, Cleveland, OK (US)

(73) Assignee: Horizon Valve Services Inc., Hominy, OK (US)

( * ) Notice: Subject to any disclaimer, the term of this patent is extended or adjusted under 35 U.S.C. 154(b) by 0 days.

(21) Appl. No.: 15/813,672

(22) Filed: Nov. 15, 2017

(65) Prior Publication Data
US 2018/0080541 A1 Mar. 22, 2018

Related U.S. Application Data

(62) Division of application No. 14/806,821, filed on Jul. 23, 2015, now Pat. No. 9,835,241.

(60) Provisional application No. 62/027,961, filed on Jul. 23, 2014.

(51) Int. Cl.
*F16H 57/04* (2010.01)

(52) U.S. Cl.
CPC ................ *F16H 57/0402* (2013.01)

(58) Field of Classification Search
CPC .................................. F16H 57/0402
See application file for complete search history.

(56) References Cited

U.S. PATENT DOCUMENTS

| 1,337,408 | A | * | 4/1920 | Morris | B60R 17/02 |
| | | | | | 134/111 |
| 1,549,952 | A | | 12/1923 | Anderson | |
| 1,829,173 | A | | 10/1931 | Wertz | |
| 2,079,989 | A | | 2/1934 | Delano | |
| 2,236,784 | A | | 7/1938 | Taylor et al. | |
| 2,425,848 | A | | 8/1947 | Dale | |
| 3,274,789 | A | | 9/1966 | Mitchell | |
| 3,385,735 | A | * | 5/1968 | Brabrand | B01D 37/00 |
| | | | | | 134/21 |
| 3,430,730 | A | | 3/1969 | Kitajima | |

(Continued)

FOREIGN PATENT DOCUMENTS

JP 52064562 5/1977

*Primary Examiner* — Michael E Barr
*Assistant Examiner* — Benjamin L Osterhout
(74) *Attorney, Agent, or Firm* — Crowe & Dunlevy, P.C.

(57) ABSTRACT

The invention relates to a system and process for removing hardened lubricant, contaminants and other debris from an enclosed gearbox of an actuator in the gas, oil, and power industries that allows the oil or gas pipeline to continue to operate uninterrupted during servicing. The system operates at a low pressure and includes two pumps: an upstream pump that pumps a non-corrosive mineral oil-based cleaning agent into the gearbox; and a downstream pump that pulls off the pressure from within the gearbox as part of the circulation of the flush system. The system and process are further provided with a clean tank for storing an influent cleaning agent, a waste tank for storing an effluent cleaning agent, and a circulation tank used during the flush circulation process. The system and process may also include a rotatable mounting assembly that is secured to the gearbox of the actuator.

11 Claims, 5 Drawing Sheets

(56) References Cited

U.S. PATENT DOCUMENTS

| | | | |
|---|---|---|---|
| 3,513,941 A * | 5/1970 | Becnel | F16H 57/0408 134/23 |
| 3,954,611 A | 5/1976 | Reedy | |
| 5,001,805 A | 3/1991 | Stouky et al. | |
| 5,005,437 A | 4/1991 | Furer et al. | |
| 5,063,896 A | 11/1991 | Hyatt et al. | |
| 5,337,708 A | 8/1994 | Chen | |
| 5,339,845 A * | 8/1994 | Huddas | B08B 9/00 134/169 A |
| 5,584,650 A | 12/1996 | Redmond et al. | |
| 5,688,076 A | 11/1997 | Atkins | |
| 6,065,567 A * | 5/2000 | Camacho | F01M 11/0458 141/98 |
| 6,213,133 B1 * | 4/2001 | Reicks | B08B 9/0325 134/102.2 |
| 6,663,718 B1 * | 12/2003 | Mush | B08B 9/00 123/198 A |
| 7,510,622 B2 | 3/2009 | Hansen | |
| 7,510,662 B1 * | 3/2009 | Hansen | F01P 11/06 134/102.2 |
| 7,987,946 B2 | 8/2011 | Leite da Silva | |
| 2002/0084144 A1 | 7/2002 | Liao | |
| 2002/0185067 A1 * | 12/2002 | Upham | B08B 7/0035 118/715 |
| 2003/0094419 A1 * | 5/2003 | Vickio, Jr. | B08B 9/0323 210/741 |
| 2004/0035805 A1 * | 2/2004 | Hansen | F01P 11/06 210/774 |
| 2005/0126271 A1 * | 6/2005 | Gorski | F16H 57/0408 73/115.02 |
| 2006/0162751 A1 | 7/2006 | Gonzalez et al. | |
| 2006/0272900 A1 | 12/2006 | Clyne | |
| 2014/0157955 A1 | 6/2014 | Walgren, Jr. et al. | |

\* cited by examiner

SYSTEM AND PROCESS FOR REMOVING HARDENED LUBRICANT FROM AN ENCLOSED GEARBOX

CROSS REFERENCE TO RELATED APPLICATIONS

This application claims priority to and is a divisional application of U.S. patent application Ser. No. 14/806,821, filed Jul. 23, 2015, which claims the benefit of U.S. Provisional Patent Application Ser. No. 62/027,961, filed Jul. 23, 2014, each of which is incorporated herein by reference in its entirety.

BACKGROUND OF THE INVENTION

1. Field of the Invention

This invention relates generally to a system and process for removing hardened lubricant from an enclosed gearbox, and more particularly to a system and process for removing dried and hardened grease, contaminants and other debris from an enclosed gearbox of a valve actuator in the gas and oil industry.

2. Description of the Related Art

Grease must bleed oil to perform its lubrication role, and when grease becomes so dry, it loses its ability to release or bleed some of its oil during operation to properly lubricate a bearing in a gear box. Typical oil bleed rates of greases for bearing lubrication are about one percent (1%) to about five (5%) percent. For this reason a bleed rate, using the standard procedure DIN 51817, of >1% is generally required; if the grease bleeds excessively, such as in excess of about six percent (6%), the grease lubrication life will be short.

There are a large number of electrical valve actuators, in particular Limitorque®, that have been in the gas and oil industry in operation since the 1950's and the grease inside the gearboxes has solidified. In order to clean the solidified grease from the enclosed gearboxes, the actuators must be taken offline and manually serviced. Downtime is the oil and gas industry's number one enemy. In an environment where equipment is expected to run 24 hours a day, 7 days a week under extreme conditions, downtime caused by equipment failure can quickly affect a company's economic health based on the loss or reduction of production, excess manhours expended to correct the problem, and possibly replacing the failed equipment with new.

It is therefore desirable to provide a system and process for removing hardened lubricant from an enclosed gearbox of a valve actuator in the gas and oil industry.

It is further desirable to provide a system and process that allows an oil or gas pipeline to continue to operate uninterrupted while the gearbox of the actuator is cleaned of grease, contaminants and other debris in order to place new grease within the gearbox without taking the valve offline.

It is still further desirable to provide a system and process for removing hardened lubricant from an enclosed gearbox of an electrical valve actuator that revives and prolongs the life of the actuator and that greatly reduces equipment failures before they occur.

It is yet further desirable to provide a system and process that utilizes an upstream pump to inject a cleaning agent under pressure in order to break down the grease without causing damage to the gearbox or its parts or causing danger by inhalation, fire, toxicity, etc. in conjunction with a downstream pump to remove the cleaning agent, lubricant, contaminants and other debris, along with minimizing the pressure within the gearbox as part of the circulation process of the flush system.

It is still yet further desirable to provide a system and process that utilizes a rotatable mounting assembly attachable to the gearbox for systematic flushing of lubricant, contaminants and other debris from the valve actuator.

Other advantages and features of the invention will be apparent from the following description and from the claims.

BRIEF SUMMARY OF THE INVENTION

In general, in a first aspect, the invention relates to a process for removing hardened lubricant, containments and/or debris from an enclosed gearbox of an actuator. The process includes pumping a heated cleaning agent from a circulation tank into the gearbox of the actuator at a first predetermined pressure level. The pressure within the gearbox is maintained at a second predetermined pressure level that is less than the first predetermined pressure level. The cleaning agent is pumped from within the gearbox to the circulation tank, and the old lubricant, containments and/or debris are removed from the gearbox.

The process can also include the steps of pumping an influent of the cleaning agent from a clean tank to the circulation tank, and/or pumping an effluent of the cleaning agent from the circulation tank to a waste tank. The influent of the cleaning agent can be heated in the circulation tank to a predetermined workable temperature, and then injected at a velocity to achieve a turbulent flow within the gearbox. The first predetermined pressure level may be less about forty pounds per square inch, and the second predetermined pressure level is about one to about three pounds per square inch.

In general, in a second aspect, the invention relates to a process for cleaning an enclosed gearbox of an actuator. The process includes injecting an influent of a heated cleaning agent into the gearbox of the actuator at a first predetermined pressure level and at a velocity to achieve a turbulent flow within the gearbox; maintaining a second predetermined pressure level within the gearbox that is less than the first predetermined pressure level; and then removing an effluent of the cleaning agent and lubricant, containments and/or debris from the gearbox. The influent of the cleaning agent can be heated in the circulation tank to a predetermined workable temperature, and then injected at a velocity to achieve a turbulent flow within the gearbox. The first predetermined pressure level may be less about forty pounds per square inch, and the second predetermined pressure level is about one to about three pounds per square inch.

DETAILED DESCRIPTION OF THE INVENTION

Figure 1:
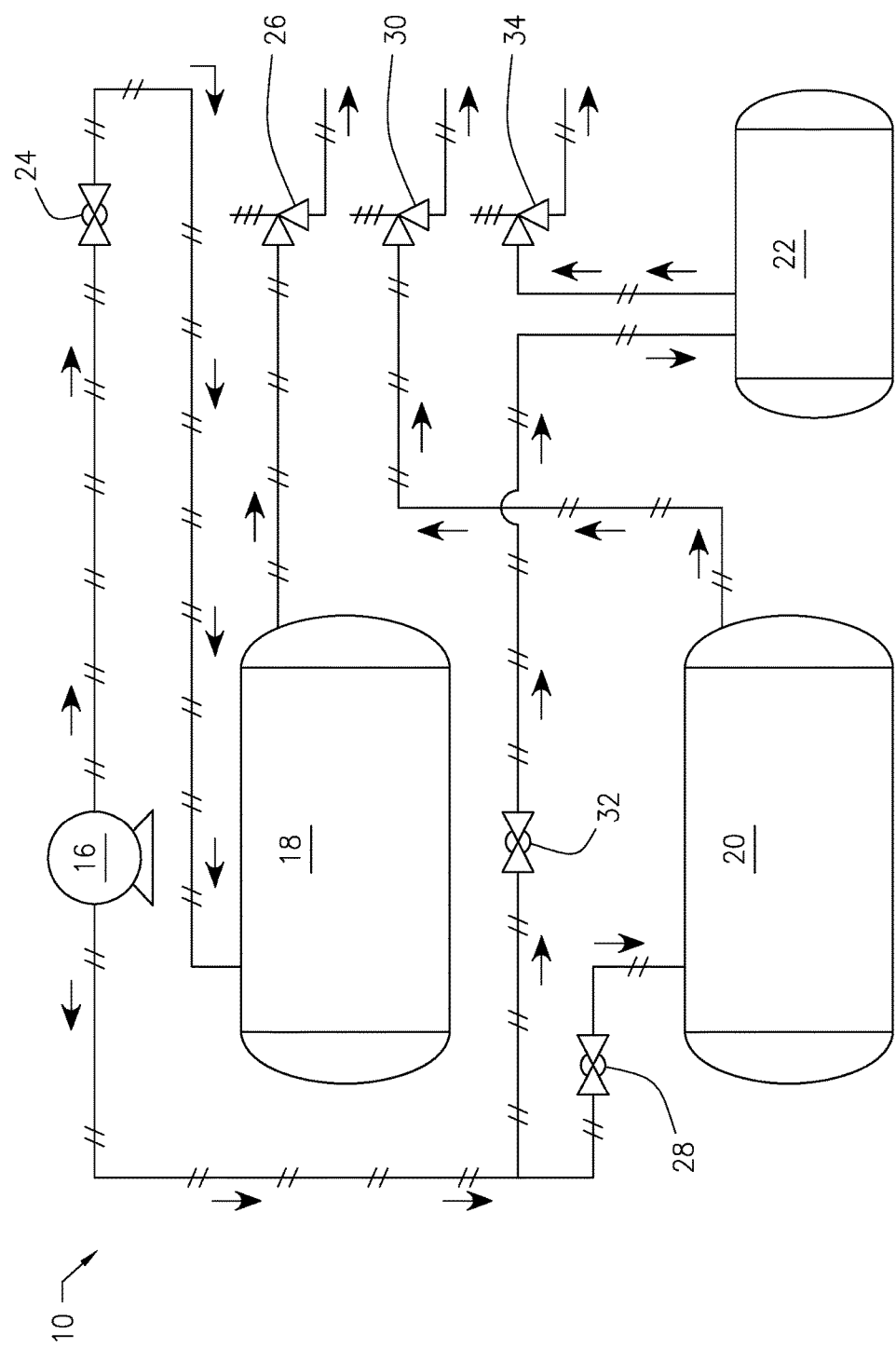
FIG. 1 is a piping and instrument diagram (P&ID) illustrating an example pneumatic flow in accordance with an illustrative embodiment of the system and process for removing hardened lubricant from an enclosed gearbox disclosed herein.

The systems and processes discussed herein are merely illustrative of specific manners in which to make and use this invention and are not to be interpreted as limiting in scope.

While the invention has been described with a certain degree of particularity, it is to be noted that many modifications may be made in the details of the construction and the arrangement of the devices and components of the systems and/or in the sequences and steps of the processes without departing from the scope of this disclosure. It is understood that the systems and processes are not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the machine be constructed or the process to be operated in a particular orientation. Terms, such as "connected," "connecting," "attached," "attaching," "join" and "joining" are used interchangeably and refer to one structure or surface being secured to another structure or surface or integrally fabricated in one piece.

In general, the invention relates to a system and process for removing hardened lubricant from an enclosed gearbox of an electrical valve actuator in the gas, oil, and power industries in order to replace with new lubricant. The system and process break down the old hardened lubricant in the enclosed gearbox and completely removes it, allowing the gas or oil pipeline to continue to operate uninterrupted while the gearbox of the actuator is cleaned of the ineffective lubricant and contaminants from minute worn parts. In addition to hardened lubricants from aging actuators in the oil and gas field, the system and process can be utilized to remove sand and other debris from the gearbox of the actuator located in sandy fields common in desert environments. The system operates at a low pressure, generally about one (1) to three (3) pounds per inch of pressure, and generally includes two pumps: an upstream pump that pumps a non-corrosive mineral oil-based cleaning agent into the gearbox; and a downstream pump that pulls off the pressure from within the gearbox as part of the circulation of the flush system. If the pressure of the system and process is too high, namely over about forty (40) pounds per inch of pressure, the lower seal to the gearbox of the actuator can be damaged and fail. As such, the system and process operate at a low pressure, generally about one (1) to about three (3) pounds per inch of pressure, thereby eliminating any damage to the lower seal of the actuator.

In addition, the system may be mounted on a mobile unit in order to access hard to reach gearboxes, such as in a gas or power plant that requires a skid or mobile unit able to fit on elevators or in an oil or gas field, pipeline exchange or storage hub. The system and process for removing hardened lubricants can be a self-contained system that is automated with sensing capabilities for taking lubricant measurements or the like. Moreover, the system and process disclosed herein can be implemented using a "smart application"-type software, allowing the system and process to be operated remotely by a tablet or smart phone. For example, the system and process may use a 64-bit processor and may include a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device. The system and remote computer may be connected via a suitable network connection, such as a T1 line, a common local area network ("LAN") connection, virtual private network connection or other network connection for computing devices. A data storage unit, such as serial flash memory, permits storage of audio files, data files, service records and other information. In addition, the system and process could utilize an application program that is resident on and run by a handheld, portable electronic device, such as a cell phone platform, for example Blackberry®, iPhone® or other smart phone electronic device or personal digital assistant ("PDA").

Referring now to the figures of the drawings, wherein like numerals of reference designate like elements throughout the several views, a system and process 10 for removing hardened lubricant from an enclosed gearbox 12 of a valve actuator 14. As exemplified in FIG. 1, the system and process 10 includes a compressor 16 in fluid communication with a waste tank 18, a clean tank 20 and a circulation tank 22 through a series of piping and valve members. Rather than utilizing compressed air or inert gases supplied by the compressor 16, the system and process 10 may utilize partial vacuum pressure supplied by a suitable pump (not shown) for moving fluids from the waste tank 18, the clean tank 20 and the circulation tank 22. The waste tank 18 is fluidly coupled at an upstream side to a waste tank pressure valve 24, which is fluidly coupled of the compressor 16. The waste tank 18 is also fluidly coupled at a downstream side to a waste tank pressure relief valve 26 for releasing excess pressure from the waste tank 18 of the system 10 to the environment. The clean tank 20 is fluidly coupled intermediate of a clean tank pressure valve 28 on an upstream side and a clean tank pressure relief valve 30 on a downstream side, and the clean tank pressure valve 28 is fluidly coupled to the compressor 16. Similarly, the circulation tank 22 is fluidly coupled to the compressor 16 on an upstream side using a circulation tank pressure valve 32 and is vented to the environment on a downstream side using a circulation tank relief valve 34.

Figure 2:
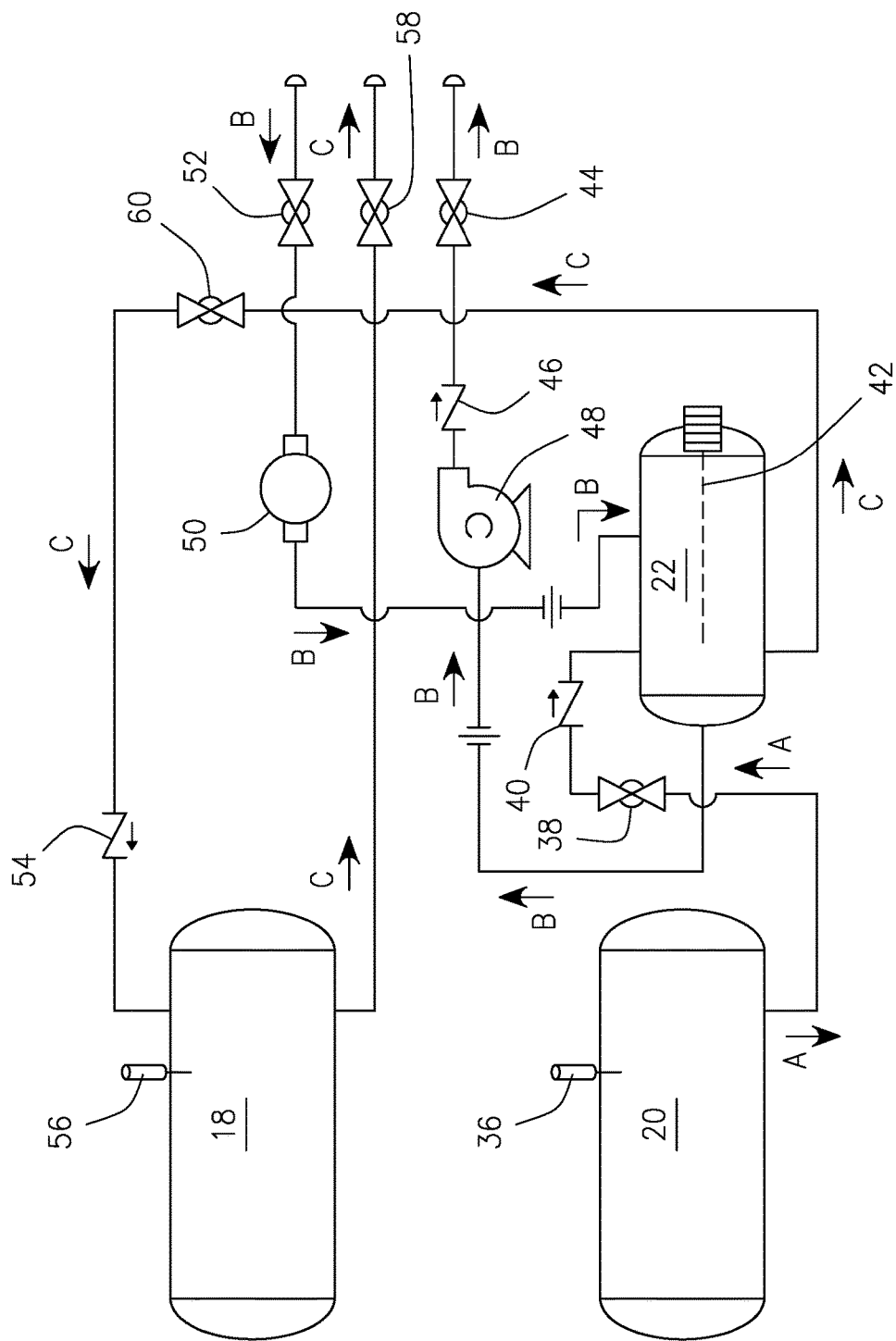
FIG. 2 is a P&ID illustrating an example fluid flow in accordance with an illustrative embodiment of the system and process for removing hardened lubricant from an enclosed gearbox disclosed herein.

FIG. 2 is a P&ID illustrating exemplary piping of the process fluid flow together with exemplary equipment and instrumentation of the system 10. The clean tank 20 includes a liquid level tank gauge 36 that measures the depth of the cleaning agent stored in the clean tank 20, and as illustrated, the cleaning agent used to flush the gearbox 12 is pumped from the clean tank 20 through an upstream flow path represented by arrows A having at least one upstream influent flow valve member, for example an upstream ball valve 38 and an upstream check valve 40 arranged in series, to the circulation tank 22. The circulation tank 22 includes at least one heating element 42 to heat the cleaning agent to a predetermined workable temperature, for example between about 150° F. to about 550° F., prior to being injected into the gearbox 12.

An upstream pump 48, such as an electrically powered centrifugal pump, forces the heated cleaning agent from the circulation tank 22 through a midstream circulation flow path represented by arrows B to at least one midstream influent flow valve member, for example a midstream ball valve 44 and a midstream check valve 46 arranged in series, to the gearbox 12. The cleaning agent is pulled through the gearbox 16 using a downstream pump 50, such as a pneumatic diaphragm pump, to flush the cleaning agent through the enclosed gearbox 12 of the actuator 14. From the gearbox 12, the cleaning agent may be recirculated along the midstream circulation flow path B to the circulation tank 22 where it can be reheated using the heating element 42 and pumped back to the gearbox 12. Once the flushing cycle is complete, the cleaning agent is pumped from the gearbox 12 through a downstream flow path represented by arrows C having a downstream effluent flow valve member, for example a downstream ball valve 52 and a downstream check valve 54 arranged in series, to the waste tank 18. The effluent cleaning agent, lubricant, contaminants and other debris flushed from the gearbox 12 can be stored in the waste tank 18, and the waste tank 18 may include a level tank gauge 56 that measures the depth of the effluent cleaning agent, contaminants and other debris stored in the waste tank 18. The effluent cleaning agent can be removed from the waste tank 18 by opening a waste tank valve member 58. The lubricant, contaminants and other debris can be filtered from the cleaning agent allowing the cleaning agent to be reused in the system and process 10. In addition, any cleaning agent within the circulation tank 22 can be pumped to along the downstream flow path C to the waste tank 18 through a circulation tank valve member 60.

The heated cleaning agent flows through the system and process 10 at a low pressure but is injected into the gearbox 12 at a high velocity to achieve a turbulent flow to remove old lubricant, contaminants and debris from the enclosed gearbox 12. By way of example, the cleaning agent may be heated to about 150° F. and then pumped from the circulation tank 22 to the gearbox 12 at a rate of about twenty-eight (28) gallons per minute using the upstream pump 48. The downstream pump 50 maintains the pressure within the gearbox 12 at about three (3) pounds per inch so as to not damage the lower seal of the actuator 14. Once flushed through the gearbox 12, the cleaning agent cools to about 110° F. and is pulled back to the circulation tank 22 or the waste tank 18 using the downstream pump 50 at a rate of about two (2) gallons per minute at about forty (40) pounds per inch of pressure.

Although the valve members of the system and process 10 in the PI&D of FIGS. 1 and 2 are illustrated as ball valves, relief valves and check valves, the invention is not so limited and other types of valves may be used, including but not limited to, gate valves, globe valves, solenoid valves, hydraulic valves, motor-operated valves, powered valves, butterfly valves, flap valves, or any other form of shut-off valves to control or stop the flow of the cleaning agent, air or gas through the piping of the system and process 10.

Figure 3:
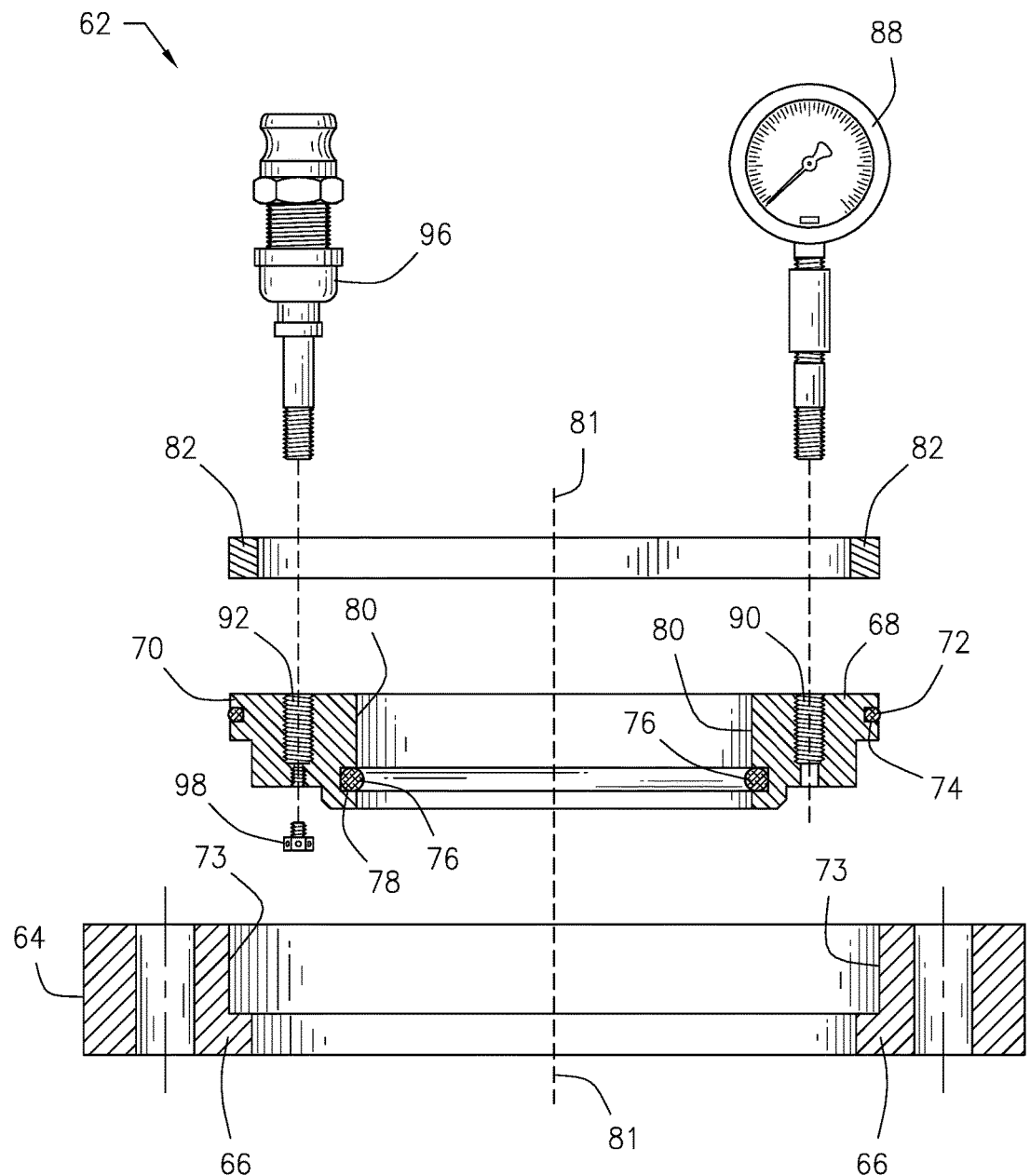
FIG. 3 is a perspective view of an example of a rotatable mounting assembly attached to the gearbox in accordance with an illustrative embodiment of the system and process for removing hardened lubricant from an enclosed gearbox disclosed herein.
Figure 4:
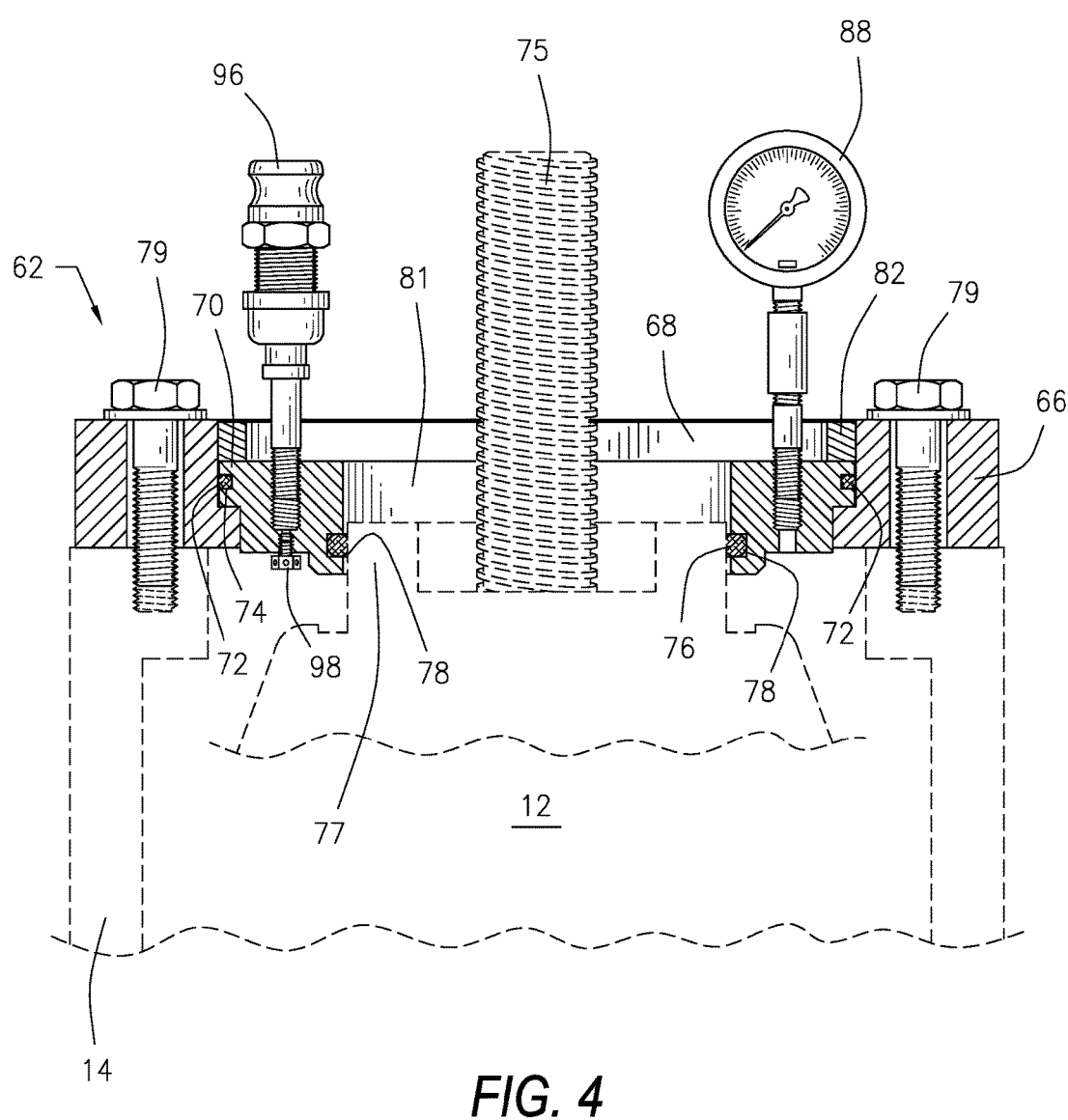
FIG. 4 is a cross-sectional view of the rotatable mounting assembly shown in FIG. 3.
Figure 5:
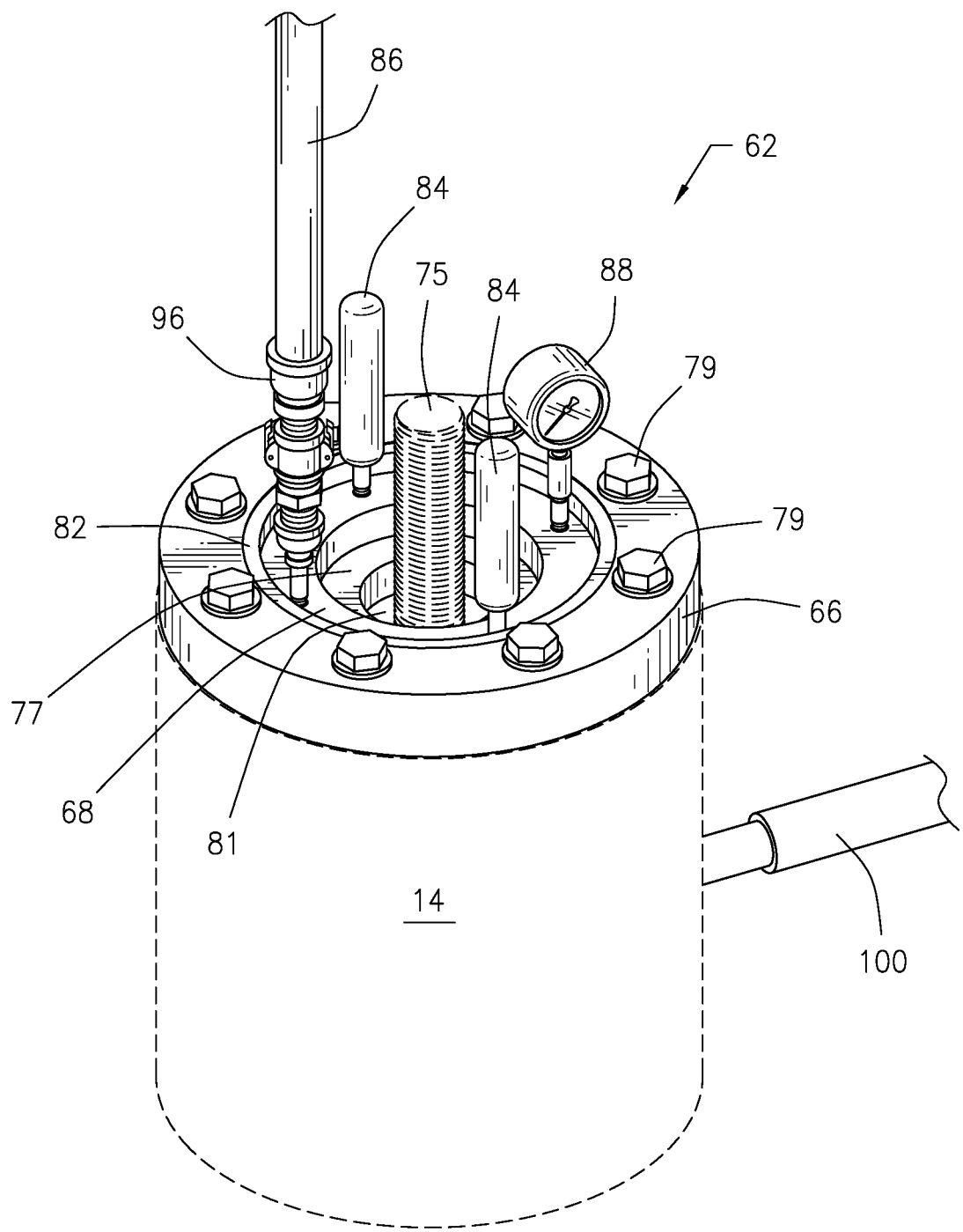
FIG. 5 is an exploded view of the rotatable mounting assembly shown in FIG. 3.

As noted above, the heated cleaning agent is injected at a high velocity to flush the hardened lubricant, contaminants and other debris from the gearbox 12. The system and process 10 can be directly connected to an inlet port (not shown) on the actuator 14, or as illustrated in FIGS. 3 through 5, the system and process 10 can include a rotatable mounting assembly 62 that is secured to the actuator 14 after a cover (not shown) of the gearbox 12 is removed. An actuator stem 75 of the actuator 16 extends through an actuating stem passage 81 of the rotatable mounting assembly 62. As exemplified, the rotatable mounting assembly 62 is constructed of a gearbox mounting plate 64 that is secured to the gearbox 12 using a plurality of fasteners 79. The mounting plate 64 includes a generally cylindrical internal sealing shoulder 66 defined within the rotatable mounting assembly 62.

The rotatable mounting assembly 62 also includes a rotating plate 68 in sealed engagement with the mounting plate 64 and the gearbox 12. The rotating plate rotates the pressure flow of the cleaning agent 360 degrees for flushing the enclosed gearbox 12 of the actuator 14. To obtain sealing between the rotating plate 68 and the mounting plate 64, the rotating plate 68 may include a circular, axially extending sealing projection 70, received within a cylindrical internal sealing surface 73 defined within the mounting plate 64 and sealed with respect to the mounting plate 64 by annular sealing elements or seal assemblies 72, which may be composed of elastomer and polymer materials capable of accomplishing effective sealing at normal operating temperatures and at all pressure ranges. The seal assemblies 72 can be carried within a circular seal groove 74 defined in the outer periphery of the axially extending circular sealing projection 68. The rotating plate 68 may also be provided with an internal circular sealing element or seal assemblies 76, which are located within a circular seal groove 78 on an internal sealing face 80 of the rotating plate 68 and which establish sealing engagement with a drive nut 77 of the gearbox 12.

The rotatable mounting assembly 62 may be further provided with a retainer element 82, which maintains sealing engagement between the rotating plate 68 and the mounting plate 64 during rotation of the rotating plate 68. The retainer element 82 also serves as a weather seal and prevents dirt and other debris from interfering with the rotatable mounting assembly 62.

The rotatable mounting assembly 62 may be further provided at least one handle 84 and a pressure gauge 88 for monitoring the operating pressure of the system and process 10 within the gearbox 12. The pressure gauge 88 is secured within a pressure flow port 90 of the rotating plate 68 of the rotatable mounting assembly 62. In addition, the rotating plate 68 includes an inlet flow port 92 having an inlet 94 secured thereto. An upper portion of the inlet 96 may be provided with an internal check valve and a quick connect fitting attachable to an input hose 86 that is in fluid communication with the midstream valve member of the system and process 10. A lower portion of the inlet 96 includes at least one nozzle 98, which can be fixed or configured to rotate at a predetermined rate of rotation, for injecting the cleaning agent pumped from the circulation tank 22 into the gearbox 12 at a high velocity to achieve a turbulent flow to remove old lubricant, contaminants and debris from the enclosed gearbox 12. An output hose 100 is in fluid communication with the effluent downstream member of the system and process 10 for pumping the cleaning agent, old lubricant, contaminants and debris from the enclosed gearbox 12 to the waste tank 18.

Whereas, the systems and processes have been described in relation to the drawings and claims, it should be understood that other and further modifications, apart from those shown or suggested herein, may be made within the scope of this invention.

What is claimed is:

1. A process for removing hardened lubricant, containments and/or debris from an enclosed gearbox of an actuator, said process comprising the steps of:
   pumping a heated cleaning agent from a circulation tank into said gearbox of said actuator at a first predetermined pressure level;
   maintaining pressure within said gearbox at a second predetermined pressure level that is less than said first predetermined pressure level;
   pumping said cleaning agent from within said gearbox to said circulation tank; and
   removing old lubricant, containments and/or debris from said gearbox.

2. The process of claim 1 further comprising the step of pumping an influent of said cleaning agent from a clean tank to said circulation tank.

3. The process of claim 1 further comprising the step of heating said influent of said cleaning agent in said clean tank to a predetermined workable temperature.

4. The process of claim 1 further comprising the step of pumping an effluent of said cleaning agent from said circulation tank to a waste tank.

5. The process of claim 1 further comprising the step of injecting said heated cleaning agent at a velocity to achieve a turbulent flow within said gearbox.

6. The process of claim 1 wherein said step of pumping said heated cleaning agent further comprises the step of pumping said heated cleaning agent from said circulation tank into said gearbox at said first predetermined pressure level of not to exceed about forty pounds per square inch.

7. The process of claim 1 wherein said step of maintaining pressure within said gearbox further comprises maintaining pressure within said gearbox between at said second predetermined pressure level of about one to about three pounds per square inch.

8. A process for cleaning an enclosed gearbox of an actuator, said process comprising the steps of:
   injecting an influent of a heated cleaning agent into said gearbox of said actuator at a first predetermined pressure level and at a velocity to achieve a turbulent flow within said gearbox;
   maintaining a second predetermined pressure level within said gearbox that is less than said first predetermined pressure level; and
   removing an effluent of said cleaning agent and lubricant, containments and/or debris from said gearbox.

9. The process of claim 8 further comprising the step of heating said influent of said cleaning agent to a predetermined workable temperature.

10. The process of claim 8 wherein said first predetermined pressure level does not exceed about forty pounds per square inch.

11. The process of claim 8 wherein said second predetermined pressure level is about one to about three pounds per square inch.

* * * * *